US009511688B2

(12) United States Patent
Linnenbrink et al.

(10) Patent No.: US 9,511,688 B2
(45) Date of Patent: Dec. 6, 2016

(54) SEATING PART OF A VEHICLE SEAT

(71) Applicant: Johnson Controls Technology Company, Holland, MI (US)

(72) Inventors: Jorg Linnenbrink, Wuppertal (DE); Ingo Kienke, Wermelskirchen (DE); Gerhard Rothstein, Velbert (DE)

(73) Assignee: Johnson Controls Technology Company, Holland, MI (US)

( * ) Notice: Subject to any disclaimer, the term of this patent is extended or adjusted under 35 U.S.C. 154(b) by 105 days.

(21) Appl. No.: 14/398,820

(22) PCT Filed: May 7, 2013

(86) PCT No.: PCT/IB2013/001403
§ 371 (c)(1),
(2) Date: Jan. 16, 2015

(87) PCT Pub. No.: WO2013/167975
PCT Pub. Date: Nov. 14, 2013

(65) Prior Publication Data
US 2015/0123442 A1     May 7, 2015

Related U.S. Application Data

(60) Provisional application No. 61/643,587, filed on May 7, 2012.

(30) Foreign Application Priority Data

Jul. 4, 2012   (DE) .................. 10 2012 013 208

(51) Int. Cl.
*A47C 1/00*    (2006.01)
*B60N 2/235*   (2006.01)
(Continued)

(52) U.S. Cl.
CPC ................. *B60N 2/235* (2013.01); *B60N 2/07* (2013.01); *B60N 2/0715* (2013.01);
(Continued)

(58) Field of Classification Search
CPC ......... B60N 2/235; B60N 2/07; B60N 2/0715; B60N 2/0722; B60N 2/08; B60N 2/161; B60N 2/1615; B60N 2/1814; B60N 2/20; B60N 2/22; B60N 2/427; B60N 2/66; B60N 2/68; B60N 2/686; B60N 2205/20
(Continued)

(56) References Cited

U.S. PATENT DOCUMENTS 3,220,767 A   11/1965   Hendrickson
3,695,696 A   10/1972   Lohr et al.
(Continued)

FOREIGN PATENT DOCUMENTS

DE   893854 C     10/1953
DE   2152104 A1   4/1973
(Continued)

OTHER PUBLICATIONS

Office Action for U.S. Appl. No. 14/399,007, dated Oct. 27, 2015.
(Continued)

*Primary Examiner* — Jose V Chen
(74) *Attorney, Agent, or Firm* — The Dobrusin Law Firm, P.C.

(57) ABSTRACT

A vehicle seat including a seat member, having a seat face and two lateral members. The seat face may be provided between the lateral members in an integral manner. The vehicle seat may further include a height adjuster for adjusting a height of the seat face, and the height adjuster may be integrated in the lateral members. Each of the lateral members may have a recess, the shape of which may change
(Continued)

during the height adjustment. The height adjuster may include a drive element. The drive element may include a rotor with helical slots. The lateral members may have projections provided which cooperate in a positive-locking manner with the helical slots. During rotation of the rotor, the projections may be moved away from each other or toward each other. Height adjustment of the seat face may be carried out.

9 Claims, 5 Drawing Sheets

(51) Int. Cl.
*B60N 2/22* (2006.01)
*B60N 2/68* (2006.01)
*B60N 2/07* (2006.01)
*B60N 2/16* (2006.01)
*B60N 2/18* (2006.01)
*B60N 2/427* (2006.01)
*B60N 2/66* (2006.01)
*B60N 2/08* (2006.01)
*B60N 2/20* (2006.01)

(52) U.S. Cl.
CPC ............ *B60N 2/0722* (2013.01); *B60N 2/08* (2013.01); *B60N 2/161* (2013.01); *B60N 2/1615* (2013.01); *B60N 2/1814* (2013.01); *B60N 2/20* (2013.01); *B60N 2/22* (2013.01); *B60N 2/427* (2013.01); *B60N 2/66* (2013.01); *B60N 2/68* (2013.01); *B60N 2/686* (2013.01); *B60N 2205/20* (2013.01)

(58) Field of Classification Search
USPC .......................................... 297/344.12, 344.1
See application file for complete search history.

(56) References Cited

U.S. PATENT DOCUMENTS

| | | |
|---|---|---|
| 3,759,587 A | 9/1973 | Christin |
| 3,874,727 A | 4/1975 | Mehnert et al. |
| 3,877,750 A | 4/1975 | Scholpp |
| 4,379,589 A | 4/1983 | Marino |
| 4,451,085 A | 5/1984 | Franck et al. |
| 4,502,730 A | 3/1985 | Kazaoka et al. |
| 4,585,272 A | 4/1986 | Ballarini |
| 4,647,109 A | 3/1987 | Christophersen et al. |
| 4,913,493 A | 4/1990 | Heidmann |
| 4,995,669 A | 2/1991 | Croft |
| 4,997,223 A | 3/1991 | Croft |
| 5,067,772 A | 11/1991 | Koa |
| 5,154,476 A | 10/1992 | Haider et al. |
| 5,163,735 A | 11/1992 | Aljundi |
| 5,251,864 A * | 10/1993 | Itou ................ B60N 2/502 248/588 |
| 5,320,410 A | 6/1994 | Faiks et al. |
| 5,346,281 A | 9/1994 | Hughes |
| 5,433,507 A * | 7/1995 | Chang ................ B60N 2/2352 297/354.12 |
| 5,466,048 A | 11/1995 | Fowler et al. |
| 5,468,048 A | 11/1995 | Clemens et al. |
| 5,577,811 A | 11/1996 | Ogg |
| 5,704,691 A | 1/1998 | Olson |
| 5,733,008 A | 3/1998 | Tame |
| 5,934,753 A | 8/1999 | Lange |
| 5,984,407 A | 11/1999 | Ligon, Sr. et al. |
| 6,022,075 A | 2/2000 | Blocker et al. |
| 6,193,318 B1 | 2/2001 | Becker et al. |
| 6,341,819 B1 * | 1/2002 | Kojima ................ B60N 2/071 248/429 |
| 6,422,651 B1 * | 7/2002 | Muhlberger ........... B60N 2/167 248/157 |
| 6,520,581 B1 * | 2/2003 | Tame .................... B60N 2/206 296/65.01 |
| 6,565,156 B1 | 5/2003 | Yamashita et al. |
| 6,592,186 B1 * | 7/2003 | Muhlberger ........... B60N 2/167 297/344.12 |
| 6,609,753 B2 | 8/2003 | Schmidt-Schaeffer |
| 6,935,693 B2 * | 8/2005 | Janscha ................. B60N 2/502 248/550 |
| 6,955,399 B2 | 10/2005 | Hong |
| 7,278,686 B2 * | 10/2007 | Yoshida ................ B60N 2/165 248/421 |
| 7,740,316 B2 * | 6/2010 | Beneker ................. B60R 22/26 297/344.11 |
| 7,837,273 B1 | 11/2010 | Ratza et al. |
| 7,926,879 B2 | 4/2011 | Schmitz et al. |
| 7,959,229 B2 * | 6/2011 | Ishijima ............... B60N 2/0296 297/337 |
| 8,162,404 B2 * | 4/2012 | Ueda .................... B60N 2/0296 297/344.12 |
| 8,333,530 B2 | 12/2012 | Omori |
| 8,376,456 B2 | 2/2013 | Fujita et al. |
| 8,480,152 B2 * | 7/2013 | Shimizu ............... B60N 2/3011 296/65.09 |
| 2002/0060487 A1 * | 5/2002 | Makosa ............... B60N 2/1615 297/344.1 |
| 2002/0089225 A1 | 7/2002 | Bruck et al. |
| 2003/0006636 A1 | 1/2003 | Ligon, Sr. et al. |
| 2003/0218368 A1 | 11/2003 | Akaike et al. |
| 2004/0160099 A1 | 8/2004 | Hong |
| 2005/0062326 A1 * | 3/2005 | Kim .................... B60N 2/01583 297/344.1 |
| 2005/0179290 A1 | 8/2005 | Hancock et al. |
| 2005/0285008 A1 | 12/2005 | Beneker et al. |
| 2006/0055219 A1 | 3/2006 | Heimann et al. |
| 2006/0152051 A1 | 7/2006 | Colja et al. |
| 2006/0226683 A1 | 10/2006 | Massara et al. |
| 2006/0244293 A1 | 11/2006 | Buffa |
| 2007/0090263 A1 | 4/2007 | Yamada et al. |
| 2007/0108816 A1 | 5/2007 | McQueen et al. |
| 2009/0026811 A1 | 1/2009 | Samain et al. |
| 2009/0096263 A1 | 4/2009 | Samain et al. |
| 2009/0174241 A1 | 7/2009 | Pattyn et al. |
| 2009/0288270 A1 | 11/2009 | Yamashita |
| 2010/0026069 A1 * | 2/2010 | Bruck ...................... B60N 2/20 297/344.1 |
| 2010/0026070 A1 * | 2/2010 | Rohee .................. B60N 2/0248 297/344.1 |
| 2010/0096897 A1 * | 4/2010 | Kienke ................. B60N 2/2352 297/367 R |
| 2010/0117419 A1 | 5/2010 | Schmitz et al. |
| 2010/0133732 A1 | 6/2010 | Yamaguchi et al. |
| 2010/0201173 A1 | 8/2010 | Boes |
| 2011/0006581 A1 | 1/2011 | Funk et al. |
| 2011/0042514 A1 | 2/2011 | Ehlers et al. |
| 2011/0042515 A1 | 2/2011 | Schoke et al. |
| 2011/0115268 A1 | 5/2011 | Maierhofer et al. |
| 2011/0127817 A1 | 6/2011 | Yu et al. |
| 2011/0304188 A1 | 12/2011 | Aktas |
| 2011/0316317 A1 * | 12/2011 | Sprenger ................ B60N 2/206 297/344.1 |
| 2012/0119555 A1 | 5/2012 | Aktas |
| 2012/0133183 A1 | 5/2012 | Kim et al. |
| 2012/0228911 A1 | 9/2012 | Piretti |
| 2013/0075571 A1 | 3/2013 | Suck et al. |
| 2013/0248675 A1 | 9/2013 | Ewald et al. |
| 2013/0313876 A1 * | 11/2013 | Perrin ...................... B60N 2/24 297/344.13 |
| 2013/0341982 A1 | 12/2013 | Maierhofer et al. |
| 2014/0138996 A1 * | 5/2014 | Kramm ................ B60N 2/0881 297/344.1 |
| 2015/0108805 A1 * | 4/2015 | Linnenbrink .......... B60N 2/546 297/325 |
| 2015/0123442 A1 | 5/2015 | Linnenbrink et al. |

(56) References Cited

U.S. PATENT DOCUMENTS

| | | | | |
|---|---|---|---|---|
| 2015/0151653 A1* | 6/2015 | Furuta | ...................... | B60N 2/68 297/344.15 |
| 2015/0203011 A1* | 7/2015 | Fujita | ...................... | B60N 2/68 297/284.11 |
| 2015/0314709 A1* | 11/2015 | Kim | ...................... | B60N 2/165 297/344.12 |

FOREIGN PATENT DOCUMENTS

| | | | |
|---|---|---|---|
| DE | 2723722 | A1 | 12/1978 |
| DE | 3937818 | A1 | 5/1991 |
| DE | 19639109 | A1 | 3/1998 |
| DE | 19961070 | C1 | 4/2001 |
| DE | 202006007862 | U1 | 9/2007 |
| DE | 102008039166 | A1 | 2/2010 |
| DE | 102009043298 | A1 | 5/2011 |
| DE | 102011106219 | A1 | 1/2012 |
| EP | 0842807 | A1 | 5/1998 |
| FR | 703111 | A | 4/1931 |
| FR | 2718398 | A1 | 10/1995 |
| FR | 2889120 | A1 | 2/2007 |
| JP | S5735648 | B2 | 7/1982 |
| JP | S57143930 | U | 9/1982 |
| JP | S59177009 | A | 10/1984 |
| JP | S608121 | A | 1/1985 |
| JP | 60160911 | U | 10/1985 |
| JP | S616038 | A | 1/1986 |
| JP | S6275735 | U | 5/1987 |
| JP | H04189635 | A | 7/1992 |
| JP | H04115448 | U | 10/1992 |
| JP | H07205690 | A | 8/1995 |
| JP | S6328043 | U | 2/1998 |
| JP | 2001105949 | A | 4/2001 |
| JP | 2005289187 | A | 10/2005 |
| JP | 2009154821 | A | 7/2009 |
| KR | 2019970008834 | A | 3/1997 |
| KR | 1020030064150 | A | 7/2003 |
| KR | 1020100049059 | A | 5/2010 |
| WO | 93/25404 | A1 | 12/1993 |
| WO | 94/07393 | A1 | 4/1994 |
| WO | 9501888 | A1 | 1/1995 |
| WO | 9720706 | A1 | 6/1997 |
| WO | 03/068557 | A1 | 8/2003 |
| WO | 2012009515 | A1 | 1/2012 |
| WO | 2013/167975 | A2 | 11/2013 |
| WO | 2013/169714 | A1 | 11/2013 |
| WO | 2013/169715 | A1 | 11/2013 |
| WO | 2013/169717 | A1 | 11/2013 |
| WO | 2013/169718 | A1 | 11/2013 |
| WO | 2013/169719 | A1 | 11/2013 |
| WO | 2013/169720 | A1 | 11/2013 |

OTHER PUBLICATIONS

Office Action for U.S. Appl. No. 14/398,498, dated Sep. 24, 2015.
Office Action for U.S. Appl. No. 14/398,577, dated Sep. 22, 2015.
Japanese Office Action for Japanese Patent Application No. 2015-510889, dated Dec. 25, 2015.
Office Action for U.S. Appl. No. 14/399,015 dated Feb. 16, 2016.
Office Action for U.S. Appl. No. 14/399,038 dated Mar. 1, 2016.
Preliminary Rejection for Korean Patent Application No. 1020147034283 dated Mar. 7, 2016.
International Preliminary Report on Patentability for Application No. PCT/IB2013/001403, dated Nov. 20, 2014.
International Search Report for Application No. PCT/IB2013/001403, dated Jun. 12, 2013.
Chinese Office Action for Related Chinese Application No. 201380033326,8, dated Jun. 15, 2016.
Office Action for U.S. Appl. No. 14/398,498 dated Jun. 6, 2016.
Office Action for U.S. Appl. No. 14/399,007 dated Apr. 29, 2016.
Office Action for U.S. Appl. No. 14/398,768 dated Jun. 9, 2016.
Office Action for U.S. Appl. No. 14/399,015 dated Aug. 18, 2016.
Office Action for U.S. Appl. No. 14/398,498 dated Sep. 29, 2016.
Office Action for U.S. Appl. No. 14/398,768 dated Oct. 6, 2016.

* cited by examiner

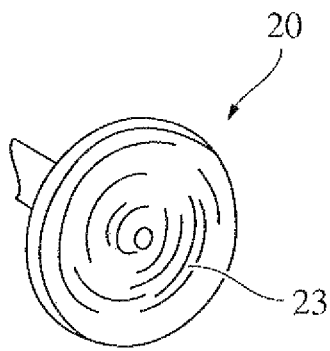
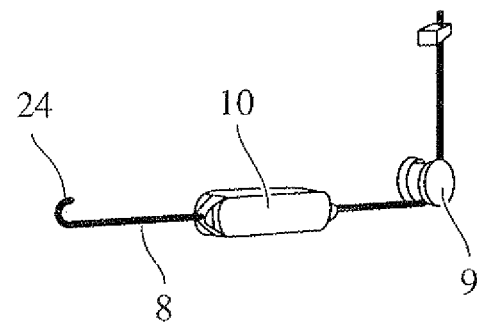
Fig. 5a          Fig. 5b
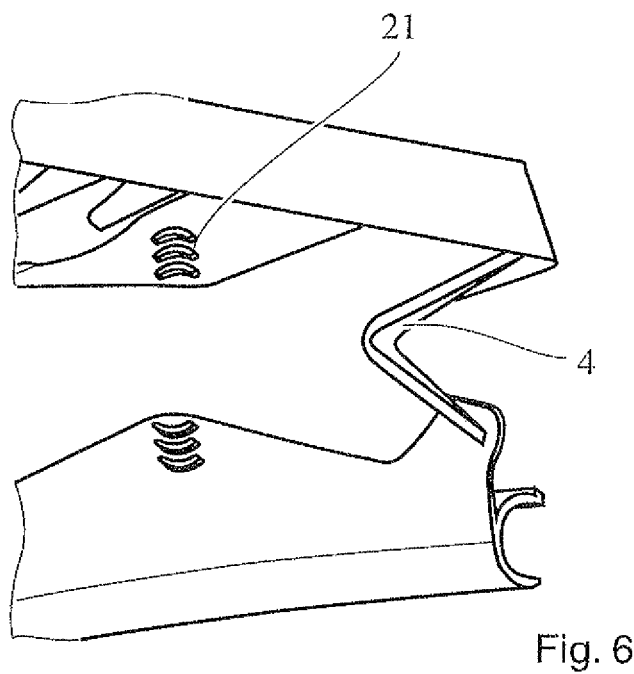
Fig. 6

SEATING PART OF A VEHICLE SEAT

The present invention relates to a vehicle seat having a seat member having a seat face and two lateral members.

Such vehicle seats are adequately known from the prior art but often have the disadvantage that they have a comparatively complex structure and/or an excessively great weight.

An object of the present invention was therefore to provide a vehicle seat which does not have the disadvantages of the prior art.

The object is achieved with a vehicle seat having a seat member having a seat face and two lateral members in which the seat face and the lateral members are provided in an integral manner.

The statements made relating to this subject matter of the present invention apply to the other aspects of the subject matter of the present invention in the same manner and vice versa.

The present invention relates to a vehicle seat. Such a vehicle seat may provide space for one or more persons. The vehicle seat according to the invention may consequently also be a bench-type seat. A backrest is preferably supported, in particular in a rotatable manner, on the seat member. This vehicle seat has a seat face which is generally provided with padding and/or a cover. To the right and to the left of the seat face are lateral members on which the upper rail of a longitudinal adjuster is generally arranged. There is provision according to the invention for the seat face and the lateral members to be provided in an integral manner. The assembly of the vehicle seat according to the invention is thereby considerably simplified. Connections, for example, welding, rivet and/or screw connections between the lateral members and the seat face, may be dispensed with. The upper rail of a longitudinal adjuster and/or the backrest connection of the backrest to the seat member is also preferably integrally connected to the lateral member.

The seat face and the lateral members and optionally the upper rail and/or the backrest connection are preferably produced from a plastics material, in particular a fiber-reinforced plastics material. The seat member may be produced, for example, by means of shaping or primary shaping, for example, with a mold filling method, such as, for example, injection or injection molding, a reinforcement material, for example, a fiber material, preferably being inserted into the mold.

Another aspect of the subject matter of the present invention which is in accordance with the invention or preferred is a vehicle seat having a seat member having a seat face, which is adjoined by two lateral members, wherein at least one resilient element is provided on each lateral member, in particular in an integral manner. The seat face can thereby be provided so as to be resilient and/or movable relative to the connection of the seat member to the bodywork of the vehicle. There is preferably provided at least one resilient element of plastics material, in particular fiber-reinforced plastics material. Preferably, at east one resilient element is constructed integrally with the lateral member and/or with the seat face.

The statements made relating to this subject matter of the present invention apply to the other aspects of the subject matter of the present invention in the same manner and vice versa.

The resilient element is preferably constructed as a leaf or leg spring. The resilient element is, for example, V-shaped, U-shaped, S-shaped, W-shaped, substantially circular or elliptical.

A front resilient element is preferably located in the region of the thigh support of the seat member and in a particularly preferred manner a rear resilient element is located in the region of the bottom support of the seat member. In a quite particularly preferred manner, these resilient elements have different resilient characteristic lines and/or different resilient excursions. Preferably, for the deformation of the resilient element in the region of the bottom, more force must be supplied than for the deformation of the resilient element in the region of the thigh support. In a particularly preferred manner, the resilient excursion with the rear resilient element is also longer. At least one, preferably the rear spring, may also be pretensioned without any load by a seat occupant, the resilience of the seat face thereby, for example, becoming harder.

Preferably or according to the invention, there is arranged on the lateral member, in particular in an integral manner, a resilient link by means of which a connection of the backrest of the vehicle seat to the seat member can be carried out. In particular, the resilient link acts in this instance as a rotary articulation for the backrest. Preferably, this resilient link is constructed as a leg spring, one leg being connected to the seat member and one leg being connected to the backrest connection and/or being provided in an integral manner. The transition between the two legs preferably constitutes the rotary bearing/rotary articulation for the backrest connection/backrest. The backrest of the vehicle seat is provided on the backrest connection, that is to say, the backrest is connected to the backrest connection or is provided integrally therewith.

The statements made relating to this subject matter of the present invention apply to the other aspects of the subject matter of the present invention in the same manner and vice versa.

The vehicle seat preferably has a recliner, by means of which the inclination of the backrest relative to the seat member can be adjusted.

According to another aspect of the subject matter of the present invention which is preferred or in accordance with the invention, at least one component, preferably a positive-locking closure means, in particular teeth, is provided integrally with the lateral member of the vehicle seat. There is preferably provided on the backrest and/or the backrest connection an adjustment and/or securing means, which cooperates with the positive-locking closure means on the lateral member in a positive and/or non-positive-locking manner, and thereby adjusts the backrest in terms of its inclination relative to the seat member and/or secures the backrest in the desired position. The adjustment can be carded out in a continuous or discontinuous manner.

The statements made relating to this subject matter of the present invention apply to the other aspects of the subject matter of the present invention in the same manner and vice versa.

According to another embodiment which is preferred or in accordance with the invention, the seat face is provided so as to be height-adjustable, the height adjuster being integrated in the lateral members.

The statements made relating to this subject matter of the present invention apply to the other aspects of the subject matter of the present invention in the same manner and vice versa.

The height adjustment may be carded out in a perpendicular manner. However, inclination adjustment is also possible with the height adjustment.

Preferably, the height adjuster changes the external form, in particular the vertical extent thereof, of the two lateral members.

Preferably, the lateral member has a recess whose shape, in particular the vertical extent thereof, changes during the height adjustment.

Preferably, the height adjuster has a drive element whose periphery changes in a reversible manner. The periphery of the drive means cooperates, for example, with components of the periphery of the recess and consequently changes the shape thereof and consequently the height of the seat face of the vehicle seat.

The drive element is preferably a helical element, for example, having a rotor, which has helical slots. There are preferably provided on the lateral members of the seat member, in particular in an integral manner, projections, for example, teeth, which co-operate in a positive-locking manner with the helical slots. During rotation, the teeth are moved away from each other or towards each other, whereby the adjustment of the height of the seat face is carried out.

Preferably, the drive element of the height adjustment is provided so as to be self-locking so that no independent adjustment of the height of the seat face can be carried out.

The drive element preferably cooperates with the recess. In the event of a movement of the drive element, for example, a rotation and/or translation, the shape of the recess is changed.

Preferably, the height adjustment has a second drive element which changes in particular the shape of the second resilient element. In a particularly preferred manner, the first drive element is directly or indirectly coupled to the second drive element so that, when one drive element is adjusted, the other is also adjusted.

The inventions are explained below with reference to FIGS. 1 to 7. These explanations are given purely by way of example and do not limit the general notion of the invention.

FIGS. 5-5b show the drive of the height adjuster,

FIG. 6 shows the positive-locking means on the lateral member of the seat member.

Figure 1:
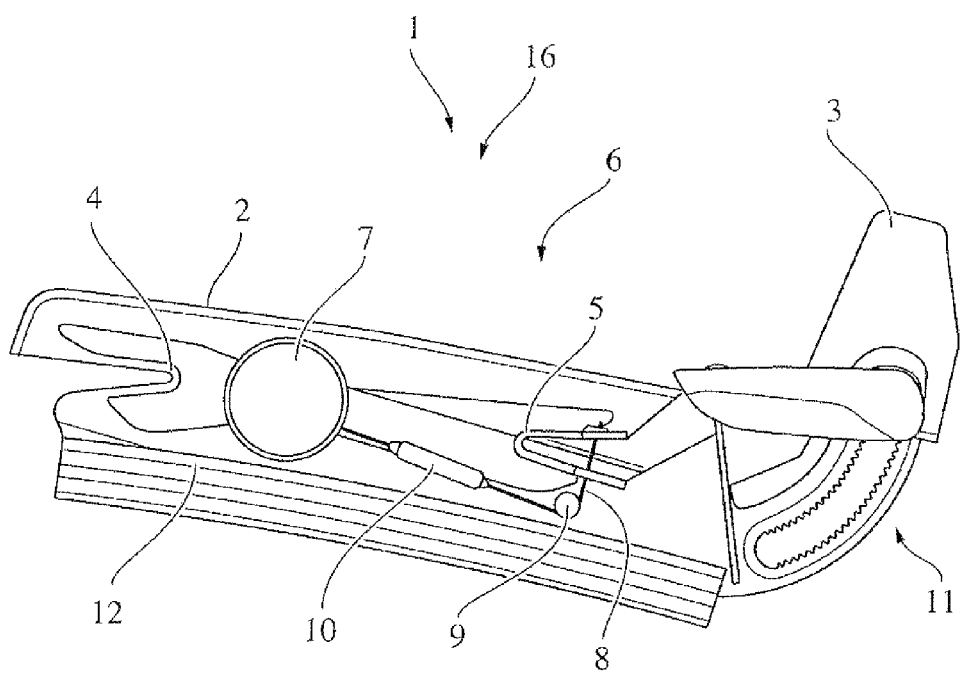
FIGS. 1-3 show the vehicle seat according to the invention.
Figure 2:
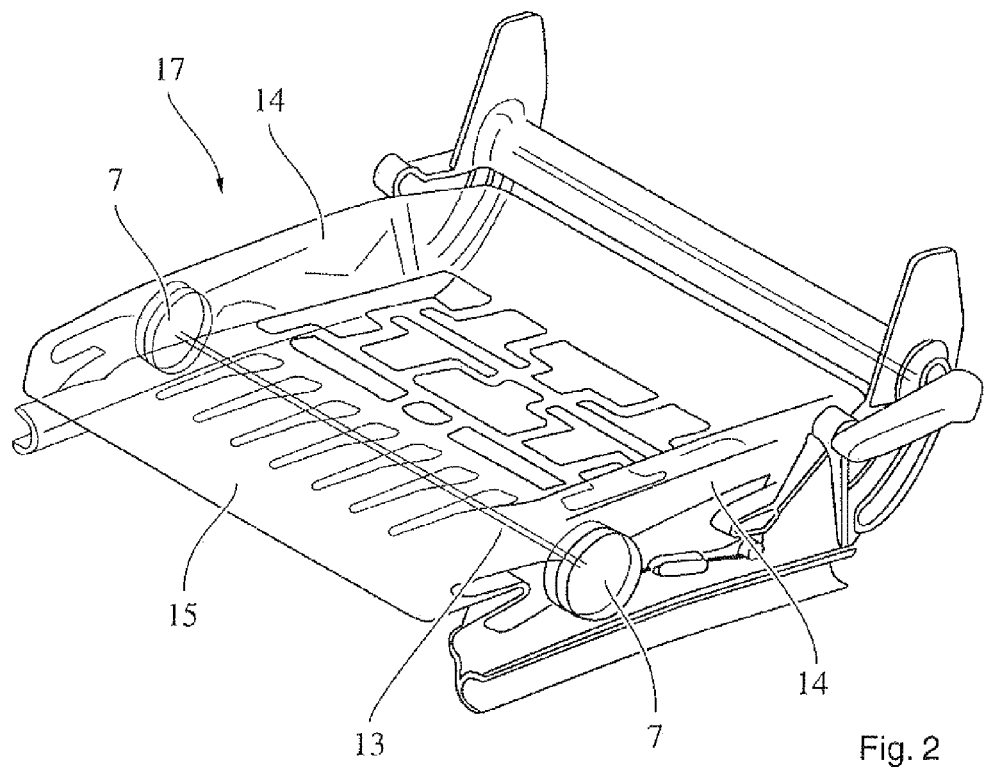
Figure 3:
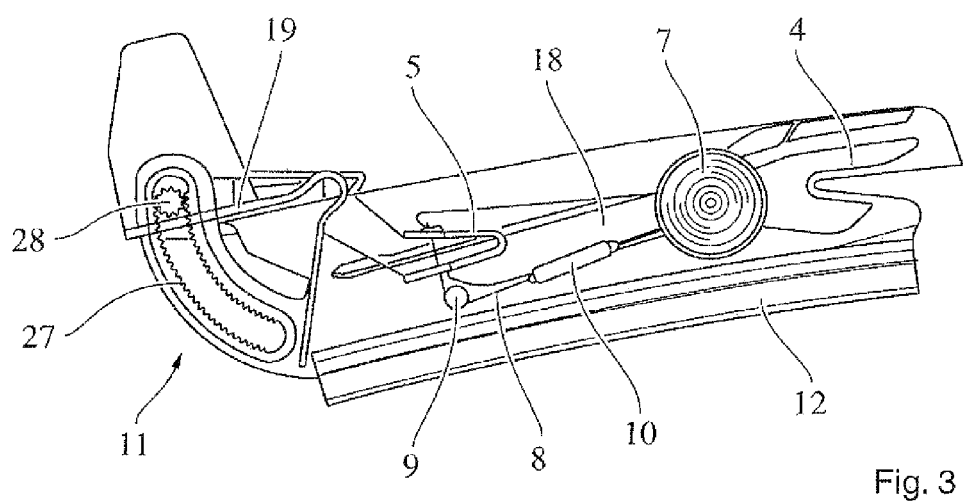

FIGS. 1-3 show the vehicle seat 1 according to the invention which has a seat member 2 and a backrest 3, only the backrest connection 3 at which the backrest is provided being illustrated in the present instance. The backrest 3 is provided so as to be able to be rotated on the seat member by means of a recliner 11. The seat member 2 has in the present case two lateral members 14, between which the seat face 15 is provided. Preferably, the seat faces 15 and the lateral members 14 are integral, in particular provided so as to comprise a plastics material, in a quite particularly preferred manner fiber-reinforced plastics material. The upper rail 12 of a rail longitudinal adjustment system is provided, preferably integrally, on each lateral member 14. More preferably, each lateral member has at least one, in the present case two, resilient element(s) 4, 5 which are arranged between the transition of the lateral member to the seat face and the upper rail 12. The front resilient element 4 is located in the region of the thigh support, whilst the rear resilient element 5 is located in the region of the bottom of the seat occupant. Both resilient elements 4, 5 are preferably provided integrally with the lateral member and/or the seat face.

More preferably, the lateral member 14 has in the present case a resilient link 19 which is also preferably integrally connected to the lateral member 14. This resilient link 19 acts as a support for the backrest 3 of the vehicle seat. In the present case, the resilient link 19 is constructed as a leg spring element, one leg being securely connected to the lateral member 14 and the other securely connected to the backrest connection 3. The circle-segment-like transition between the legs acts as a rotation axis for the backrest. The resilient link 19 is preferably provided so as to comprise plastics material, in particular fiber-reinforced plastics material. In the present embodiment, a portion of the recliner 11, that is to say, the positive-locking means 27, is also provided integrally with the lateral member and preferably so as to comprise plastics material, in particular fiber-reinforced plastics material. In the present case, the positive-locking means 27 is provided as a slot, in which teeth are provided in the present case at two opposing sides of the slot. The slot is preferably constructed in the manner of a circle segment. The slot receives an adjustment and/or locking means 28, which has positive-locking means which complement the positive-locking means 27 and which is, in particular rotatably, connected to the backrest and/or the backrest connection. Using the adjustment and/or locking means 11, the backrest can be adjusted in terms of its inclination relative to the seat member and/or locked in the desired position in each case. The adjustment can be carded out in a continuous manner or in a discontinuous manner. Furthermore, in the present case the vehicle seat according to the invention has a height adjuster 16 which is integrated in the two lateral members 14 of the seat member. This height adjuster has an adjustment mechanism 6, by means of which the height of the seat face 15 can be adjusted. In the present case, the adjustment mechanism 6 changes the shape of a recess 18, which is located in each lateral member 14 between the connection of the seat face 15 to the lateral member 14 and the upper rail 12. Owing to this change in shape, in which the shape of the resilient elements 4, 5 is also changed, the seat face can be adjusted in terms of its height. This height adjustment can be carried out in such a manner that the seat face is displaced parallel with the original orientation thereof in an upward or downward direction, preferably in a purely perpendicular manner. However, an inclination adjustment of the seat face 15 is also possible during the height adjustment. In the present case, the adjustment mechanism 6 has a drive element 7, for example, a helical positive-locking means, which cooperates with the inner side of the recess 18 and thereby changes its shape. Preferably, the drive element 7 is arranged in the front region of the seat face so that, in the event of an accident, in particular in the event of a front-end impact, so-called "submarining" can be prevented and the forces which occur only have to be absorbed partially by the resilient element 4. The resilient element 4 can thereby be provided with a smaller resilient force than, for example, the resilient element 5, which is advantageous in particular since the main load of the seat occupant has to be absorbed by the resilient element 5 and not by the resilient element 4. Preferably, the drive element 7 is connected to another drive element 8, 9, 10, which cooperates directly with the resilient element 5 and compresses it, if necessary. The position of the seat face 15 and/or the resilient force available can thereby be changed. In the present case, the second drive element comprises a cable pull 8, which is connected to the drive element 7 in this instance by means of a roller 9. When the drive element 7 is rotated, the cable 8 is pulled or released at the same time so that the shape of the resilient element 5 changes. In the cable pull 8, a step-down or step-up mechanism 10 of the adjustment path may be provided, for example, in the form of a pulley block.

Figure 4:
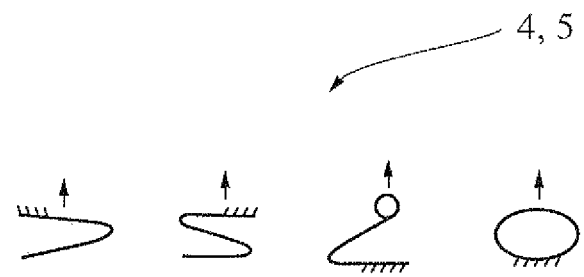
FIG. 4 shows possible embodiments of the resilient element.

FIG. 4 shows possible forms of the resilient element 4, 5. The shape of the resilient element is in particular selected in accordance with the resilient force and/or resilient excursion which is intended to be provided at what location, and/or which crash loads are intended to be absorbed. The person skilled in the art recognizes that the resilient elements 4, 5 can be constructed differently. In particular it is advantageous for a greater resilient force to be provided with the resilient element 5 than with the resilient element 4 since this absorbs the main load of the seat occupant.

Figure 5:
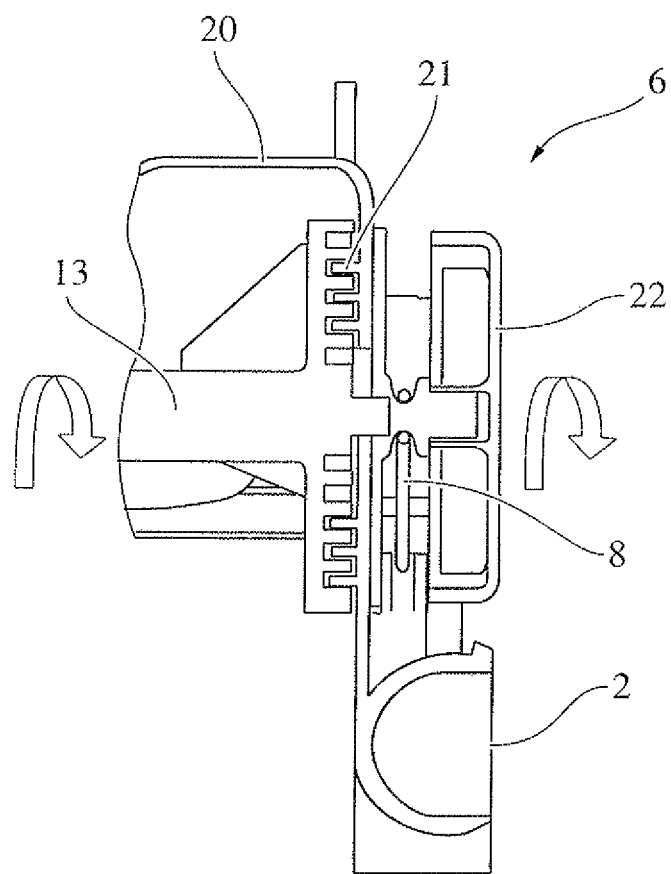

FIG. 5 shows a possible embodiment of the adjustment mechanism 6. It has a rotor 20, which is provided with helical slots. Positive-locking means, for example, teeth, which are provided above and below the recess 18, preferably integrally with the lateral member, engage in these helical slots. The rotor 20 is rotated, for example, by means of a handle 22 or with a motor. The rotor 20 also rotates and the positive-locking means 21 above or below the recess 18 are pressed apart or pulled together. The rotation of the rotor 20 is transferred by means of a torque transmission 13 to a rotor which cooperates with positive-locking means of the other lateral member. The torque transmission 13 also preferably serves to stabilize the seat member. Details of the rotor 20 and the helical slots thereof can be taken from FIG. 5a. It can clearly be seen that the helical slots are provided at an end face of the rotor. As can be seen in particular with reference to FIGS. 5 and 5b, the adjustment mechanism has in the present case a second drive element which comprises a transmission means, in this instance a cable pull 8, which has at one end thereof a connection means 24 which is connected to the handle 22 in a rotationally secure manner in this instance. At the other end thereof, the cable pull cooperates with the resilient element 5. When the handle 22 is rotated, the cable pull 8 is also moved and thereby contracts the resilient element 5 or the spacing of the legs of the resilient element 5 increases. The cable pull 8 may have a translation means 10, for example, a pulley block.

FIG. 6 shows the positive-locking elements 21, which cooperate with the helical slots of the rotor 20. Owing to a rotation of the rotor, the height adjustment HA is carried out, during which the members of the resilient element 4 are pulled together or pressed apart.

Figure 7:
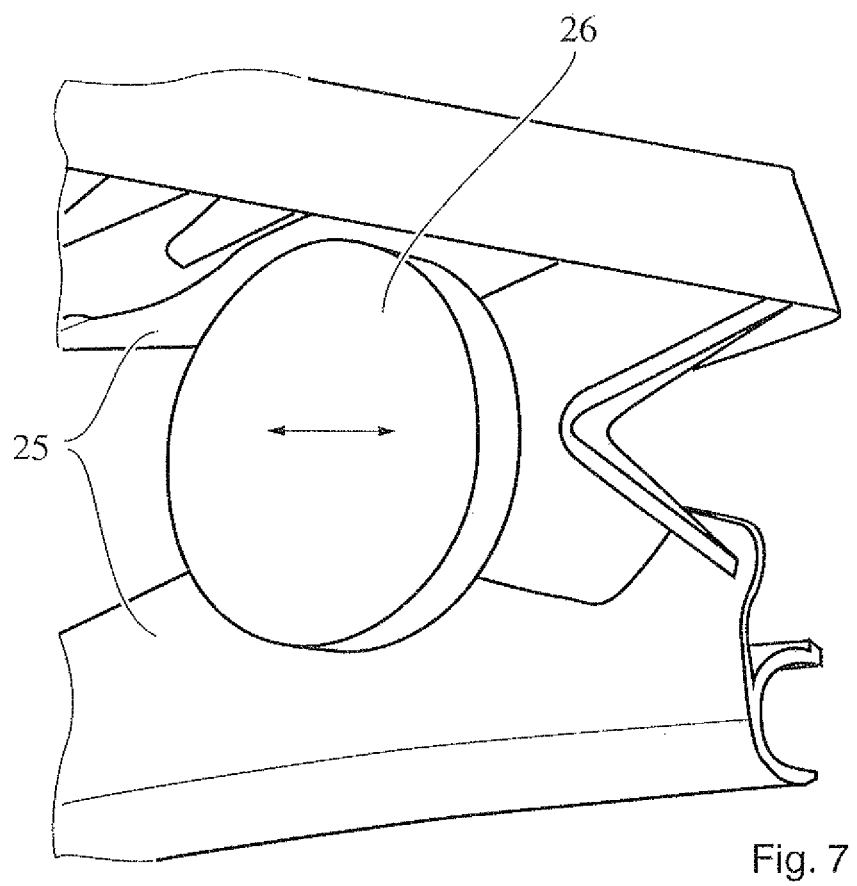
FIG. 7 shows another embodiment of the height adjuster.

FIG. 7 shows another embodiment of the adjustment mechanism 6. In the present case, it has a drive element, that is to say, a displacement element 26, which can be displaced in the direction indicated by the double-headed arrow, for example, by means of rotation. This displacement element cooperates with the adjustment faces 25 of the lateral member and thereby presses them apart, whereby a height adjustment is carried out. The displacement element 26 can also be connected to another adjustment element, as illustrated, for example, in FIG. 5, in order to change the shape of the resilient element 5.

LIST OF REFERENCE NUMERALS

1 Vehicle seat
2 Seat member
3 Backrest, backrest connection
4 Front resilient element
5 Rear resilient element
6 Adjustment mechanism
7 Drive element, helical drive element
8 Transmission means, cable pull
9 Redirection roller
10 Step-up/step-down mechanism
11 Recliner
12 Upper rail
13 Torque transmission
14 Lateral member of the seat member
15 Seat face
16 Height adjuster
17 Carrier structure
18 Recess
19 Resilient link
20 Rotor with helical slots
21 Positive-locking means, projection
22 Handle, hand wheel
23 Slot, helical slot
24 Connection means
25 Adjustment faces
26 Drive element, displacement element
27 Positive-locking means, teeth
28 Adjustment/locking means
HA Height adjustment, vertical extent

The invention claimed is:

1. A vehicle seat comprising a seat member, having a seat face and two lateral members,
   wherein the seat face is provided between the lateral members in an integral manner;
   wherein the vehicle seat further comprises a height adjuster for adjusting a height of the seat face, wherein the height adjuster is integrated in the lateral members;
   wherein each of the lateral members has a recess, a shape of which changes during the height adjustment;
   wherein the height adjuster has a drive element;
   wherein the drive element comprises a rotor with helical slots; and
   wherein on the lateral members projections are provided which cooperate in a positive-locking manner with the helical slots, whereby during rotation of the rotor the projections are moved away from each other or towards each other, and whereby the height adjustment of the seat face is carried out.

2. The vehicle seat as claimed in claim 1, wherein at least one resilient element is provided on each lateral member in an integral manner.

3. The vehicle seat as claimed in claim 2, wherein at least two resilient elements are provided on each lateral member.

4. The vehicle seat as claimed in claim 3, wherein the resilient elements have different resilient characteristic lines or different resilient excursions to absorb different loads in dependence of a location relative to a seat occupant and in dependence of forces in a crash situation.

5. The vehicle seat as claimed in claim 2, wherein each lateral member has a resilient link in an integral manner, which is provided with a backrest connection in an integral manner.

6. The vehicle seat as claimed in claim 1, wherein the drive element has a periphery that can be changed in a reversible manner by cooperating with components of a periphery of the recess to consequently change the height of the seat face.

7. The vehicle seat as claimed in claim 6, wherein the drive element cooperates with the recess and changes a shape thereof.

8. The vehicle seat as claimed in claim 7, wherein the height adjustment has a second drive element which changes a shape of a second resilient element.

9. The vehicle seat as claimed in claim 6, wherein the drive element cooperates with a positive-locking means, which are provided on the lateral member.

\* \* \* \* \*